United States Patent [19]

Hamano et al.

[11] 4,401,252

[45] Aug. 30, 1983

[54] METHOD OF CONNECTING ARMATURE COIL

[75] Inventors: Isao Hamano; Kiyoshi Yabunaka, both of Himeji, Japan

[73] Assignee: Mitsubishi Denki Kabushiki Kaisha, Tokyo, Japan

[21] Appl. No.: 212,721

[22] PCT Filed: Apr. 30, 1980

[86] PCT No.: PCT/JP80/00091

§ 371 Date: Nov. 5, 1980

§ 102(e) Date: Nov. 5, 1980

[87] PCT Pub. No.: WO80/02481

PCT Pub. Date: Nov. 13, 1980

[30] Foreign Application Priority Data

May 7, 1979 [JP] Japan .................................. 54-56755

[51] Int. Cl.³ ........................ B23K 20/10; H01R 43/02
[52] U.S. Cl. ..................................... 228/110; 228/1 R
[58] Field of Search ........................ 228/1 R, 110, 111

[56] References Cited

U.S. PATENT DOCUMENTS 3,791,569  2/1974  Mims ..................................... 228/1 R
4,027,370  6/1977  Bachar ............................ 228/1 R X

FOREIGN PATENT DOCUMENTS 39-9472   6/1964  Japan .
51-2905   1/1976  Japan .

Primary Examiner—Kenneth J. Ramsey
Attorney, Agent, or Firm—Oblon, Fisher, Spivak, McClelland & Maier

[57] ABSTRACT

The present invention relates to a method of connecting an armature coil with a commutator segment which includes connecting the end portion of an armature coil by ultrasonic welding to the commutator segment which is arranged in the same direction as the axis of a shaft and is initially formed with a molded substrate, wherein said ultrasonic welding is performed while the commutator segment is fixed in place by a rigid pressing member. The present invention is suitable for connecting the armature coil of a rotary machine such as the starter motor to a commutator segment.

2 Claims, 4 Drawing Figures

METHOD OF CONNECTING ARMATURE COIL

TECHNICAL FIELD

The present invention relates to a method of connecting an armature coil of a rotary machine such as a starter motor to a segment of a commutator by ultrasonic welding.

BACKGROUND ART

FIG. 1 is a sectional view of an apparatus for a conventional method of connecting the armature coil of the rotary machine.

The conventional method will be described referring to FIG. 1. In FIG. 1, the reference numeral (1) designates the shaft of a starter motor; (2) designates an armature core fitted to the shaft; (3) designates an armature coil wound in slots (not shown) formed in the armature core; (3a) designates an end portion of the coil; and (4) designates a commutator to which the end portion (3a) is connected. The commutator (4) comprises a bushing (5) fitted around the shaft (1); a plurality of segments (7) arranged in the same direction as the axis of the shaft (1) so as to provide a sliding surface for brushes (not shown); and a molded substrate (6) for molding these members in one piece. Reference numerals (6a) and (6b) designate edges of the molded substrate (6) for assuring a rigid bonding of the segment (7); (8) designates an ultrasonic welding apparatus which comprises an ultrasonic power producer (9); and FIG. 1 as shown a coil (10), magnetostriction element (11), a horn (12) and a tip (13).

The operation of the structure stated above will now be described. The end portion (3a) of the armature coil put on the end of the segment (7) is applied with compressive force in the direction P and vibrating force in the direction Q, as shown in FIG. 1, by ultrasonic vibration produced by the ultrasonic welding apparatus through the tip (13) so that the end portion (3a) of the coil is firmly connected to the segment (7) by the effect of ultrasonic vibration.

In the conventional ultrasonic welding performed as described above, vibration is applied to the segment (7) by a frictional force caused when the ultrasonic vibration is applied to the end portion (3a) of the coil to release the bonding of the segment from the molded substrate, thereby breaking the molded substrate. Accordingly, it is necessary to receive and absorb the excited vibrating force caused by the ultrasonic wave by the bonding strength of the molded substrate (6). This disadvantageously requires an increased width dimension of end portions (6a), (3b) of the molded substrate; an increased molding surface area for enhancing the bonding strength of the molded substrate (6) to the segment (7); and the provision for a groove for retaining the segment against too high a revolutional velocity. Furthermore, a complicated structure and a requirement of increased volume of materials disadvantageously causes higher manufacturing cost of the commutator.

DISCLOSURE OF INVENTION

It is an object of the present invention to provide a method of connecting an armature coil of a rotary machine to a commutator segment in which the segment arranged in the same direction as the axis of a shaft and formed in one piece with a molded substrate has applied thereto ultrasonic waves such that the segment is fixed by a rigid member for the purpose of performing ultrasonic welding.

In accordance with the present invention, in connecting the end portion of the armature coil to the segment by the ultrasonic welding, ultrasonic welding is performed such that the segment is fixed by the rigid member. Accordingly, cracking of the molded substrate and deterioration of bonding strength of the segment are not caused by vibrating of the segment.

BEST MODE FOR CARRYING OUT THE INVENTION

Figure 1:
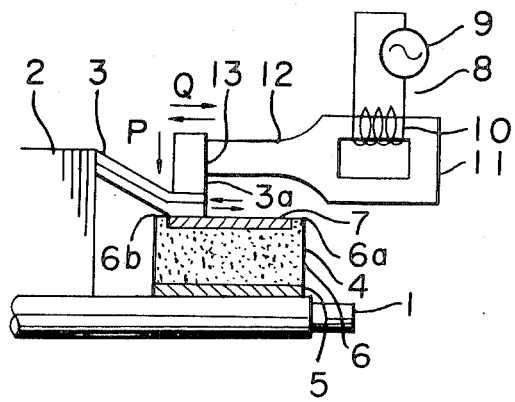
FIG. 1 is a schematic diagram showing the conventional method.
Figure 2:
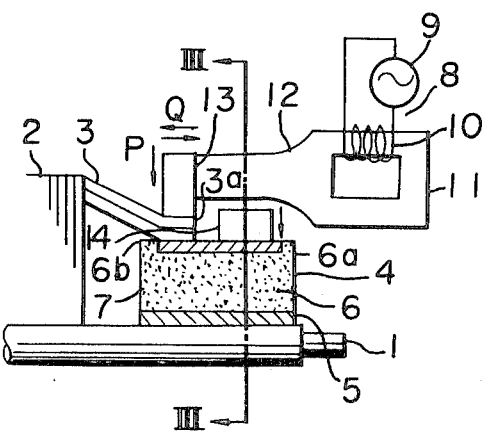
FIG. 2 is a schematic diagram showing an apparatus embodying the present invention.
Figure 3:
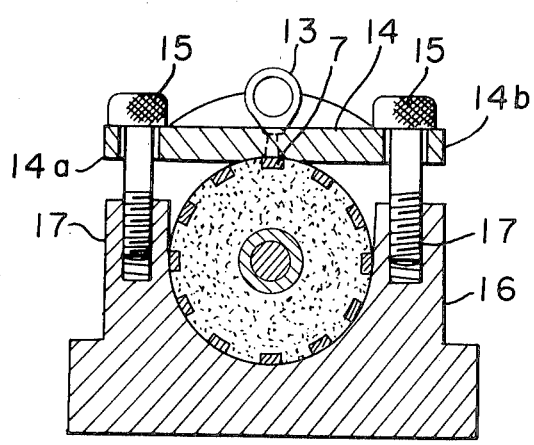
FIG. 3 is a sectional view taken along line III—III of FIG. 2.
Figure 4:
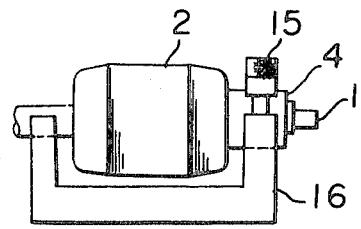
FIG. 4 is a side view of the apparatus shown in FIG. 2.

FIGS. 2 to 4 are schematic views illustrating the method of the present invention. In FIGS. 2 to 4, reference numeral (14) designates a pressing bar applying a radially inwardly directed force on the periphery of substrate 6; (15) designates fastening bolts which pass through openings (14a), (14b) formed in the pressing bar; and (16) designates a nesting structure having threaded holes (17) within which the fastening bolts are screwed. With this structure, the armature is mounted on the nesting structure (16) and the segment (7) of the commutator (4) is secured through the fastening bolts (15) to the pressing bar (14) on the nesting structure (16) and then the segment 7 and the end portion (3a) of the coil have ultrasonic waves applied to them to weld them together.

In the ultrasonic welding apparatus for connecting the armature having the structure described above, the end portion (3a) of the coil vibrated through the tip (13) by the ultrasonic power producer (9) is reciprocally moved on the segment (7) in the direction Q while it is compressed in the direction P, as shown in FIG. 2. The frictional force produced during the reciprocal movement vibrates the segment (7). However, vibration is prevented by the provision of the pressing bar (14). Accordingly, the vibrating force applied to the end portion (3a) of the coil is converted to frictional energy required for ultrasonic welding without being substantially released outside so that peeling-off of the segment (7) from molded substrate (6) and the cracking of the molded substrate ends (6a), (6b) caused by the vibration can be prevented.

In the above embodiment, the combination of the pressing bar (14) and the fastening bolts (15) is used as a rigid member in order to fix the segment (7). However, a similar effect can be obtained by employing a toggle clamp device and an operating force of a hydraulic or a pneumatic cylinder instead of fixing function of the pressing bar.

INDUSTRIAL APPLICABILITY

The present invention can be applied to the connection of the conductor of electric devices and apparatuses as well as the connection of the armature coil of a rotary machine.

We claim:

1. A method of unitarily connecting an end portion of an armature coil to a one-piece, molded substrate type commutator segment fitted around a motor shaft wherein said commutator segment is arranged in the direction of the axis of said shaft, which comprises:
   peripherally contacting said commutator segment with a pressing member;
   applying a radially inwardly directed pressing force to said commutator segment; and
   ultrasonically welding said end portion of said armature coil to said commutator segment.

2. A method of connecting an armature coil to a commutator segment according to claim 1, which further comprises supporting said armature coil with a nesting structure prior to contacting said commutator segment with said pressing member and adjustably mounting said pressing member to said nesting structure such that said commutator segment is located between said pressing member and said nesting member.

* * * * *